US009296267B2

(12) United States Patent
McIntyre et al.

(10) Patent No.: US 9,296,267 B2
(45) Date of Patent: Mar. 29, 2016

(54) METHODS, SYSTEMS AND DEVICES FOR RECORDING AND TRANSMITTING IDENTIFICATION INFORMATION OF TIRE PRESSURE MONITORING SENSORS TO A VEHICLE

(71) Applicant: Continental Automotive Systems, Inc., Auburn Hills, MI (US)

(72) Inventors: Matthew D McIntyre, New Baltimore, MI (US); Jean-Chrstophe Deniau, Fenton, MI (US); Brian J Farrell, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 76 days.

(21) Appl. No.: 13/942,210

(22) Filed: Jul. 15, 2013

(65) Prior Publication Data
US 2015/0015389 A1 Jan. 15, 2015

(51) Int. Cl.
*B60C 23/00* (2006.01)
*B60C 23/04* (2006.01)
*B60R 25/24* (2013.01)

(52) U.S. Cl.
CPC ......... *B60C 23/0408* (2013.01); *B60C 23/0471* (2013.01); *B60C 23/0472* (2013.01); *B60C 23/0479* (2013.01); *B60R 25/24* (2013.01)

(58) Field of Classification Search
CPC .................. B60C 23/0479; B60C 23/0408
USPC ................. 340/442, 444, 445, 447; 73/146.2, 73/146.3; 701/31.4
See application file for complete search history.

(56) References Cited

U.S. PATENT DOCUMENTS

| | | | | |
|---|---|---|---|---|
| 5,463,374 | A * | 10/1995 | Mendez et al. | 340/442 |
| 7,002,455 | B2 * | 2/2006 | Buck et al. | 340/442 |
| 2002/0092347 | A1 * | 7/2002 | Niekerk et al. | 73/146.2 |
| 2005/0132792 | A1 | 6/2005 | Lemense et al. | |
| 2006/0042734 | A1 * | 3/2006 | Turner et al. | 152/154.2 |
| 2006/0081697 | A1 | 4/2006 | Brinton et al. | |
| 2008/0164988 | A1 * | 7/2008 | DeKeuster et al. | 340/442 |
| 2010/0066524 | A1 | 3/2010 | Yu | |
| 2010/0305809 | A1 * | 12/2010 | Audisio et al. | 701/33 |
| 2012/0050029 | A1 | 3/2012 | Yu et al. | |
| 2012/0218096 | A1 | 8/2012 | Yu et al. | |
| 2013/0061456 | A1 * | 3/2013 | Lefaure et al. | 29/595 |

FOREIGN PATENT DOCUMENTS

WO 2013063061 A1 5/2013

OTHER PUBLICATIONS

PCT/US2014/046468 Search Report and the Written Opinion of the International Searching Authority dated Oct. 6, 2014.

* cited by examiner

*Primary Examiner* — Van Trieu

(57) ABSTRACT

The present invention relates to recording and storing identification information of tire pressure monitoring sensors and transmission of the stored identification information to a tire pressure monitoring system. In a first aspect, the present invention provides a method of integrating one or more tire pressure monitoring sensors with a tire pressure monitoring system of a vehicle. The method includes programming and/or configuring a tire pressure monitoring sensor with a suitable program software for a tire pressure monitoring system of a vehicle. The method also includes utilizing a configuration tool to cause the tire pressure monitoring sensor to generate a signal including an identifier. The method further includes recording the identifier on a memory device of the configuration tool. The method further includes transmitting the recorded identifier from the configuration tool to a memory device of a vehicle when the vehicle enters a learning mode.

28 Claims, 7 Drawing Sheets

METHODS, SYSTEMS AND DEVICES FOR RECORDING AND TRANSMITTING IDENTIFICATION INFORMATION OF TIRE PRESSURE MONITORING SENSORS TO A VEHICLE

CROSS-REFERENCE TO RELATED APPLICATION

The present application is related to commonly owned U.S. Non-provisional patent application Ser. No. 13/942,168 titled: METHODS, SYSTEMS AND DEVICES FOR RECORDING AND TRANSMITTING IDENTIFICATION INFORMATION OF TIRE PRESSURE MONITORING SENSORS TO A VEHICLE, filed Jul. 15, 2013, and U.S. Non-provisional patent application Ser. No. 13/942,247 titled: METHOD AND DEVICES FOR WRITING AN IDENTIFIER TO A TIRE PRESSURE MONITORING SENSOR, filed Jul. 15, 2013, the contents of both are hereby incorporated by reference in their entirety for all purpose

TECHNICAL FIELD

The present invention relates to methods, systems and devices for programming and/or configuring, recording and storing identification information of tire pressure monitoring sensors and transmission of the stored identification information to a tire pressure monitoring system of a vehicle.

BACKGROUND

Commercial and non-commercial vehicles now have tire pressure monitoring systems (TPMS) which include a central module, integrated or in communication with an electronic control unit of the vehicle, and tire pressure monitoring sensors (TPM sensors) for each vehicle wheel unit. In general, the TPM sensors monitor tire pressure within a respective tire and transmit a wireless signal to the central module which at a minimum includes tire pressure data. Should the sensed pressure be outside of an acceptable range or a substantial change in tire pressure occur, an alarm is generated and transmitted to the user of the vehicle.

Over time, TPM sensors require replacement by service technicians due to damage, depleted battery or otherwise. This requires installation and integration of new TPM sensors with a TPMS of a vehicle. During this process, in one configuration, the technician places the TPMS receiver of the vehicle in a learning mode and triggers each TPM sensor for identification purposes. The technician then sequentially triggers each TPM sensor utilizing a TPMS configuration tool, causing each sensor, new or existing, to transmit a wireless signal including an identifier to a control module of the TPMS. These tools communicate with a sensor through low frequency signals which in turn communicate with the TPMS through a higher frequency radio signal. The control module records the identifier, which may comprise numbers, letters, a combination of numbers and letters or any other identifying identifier, of each signal so as to interpret the location of TPM sensor data during operation thereof.

In a learning process of a typical TPMS, a technician places the TPMS receiver of the vehicle in learning mode by performing one or more steps, such as cycling an ignition key, pressing remote buttons, depressing a brake pedal, utilizing door lock switches, utilizing headlight switches, combinations thereof, or otherwise. As should be appreciated, this can be a laborious task. Once the learning processes is initiated, the TPMS tool indicates which tire pressure monitoring sensor installed on the vehicle should be triggered. The service technician moves to the specified wheel unit and utilizes the TPMS configuration tool to cause a corresponding TPM sensor to transmit a signal including an identification identifier. Once the signal is received by the control module, the control module confirms the learning of the TPM sensor by either an audible signal or visual signal. The TPMS tool also receives the sensor data and indicates which TPM sensor is to be triggered next. This continues until all of the TPM sensors have been sequentially triggered, which requires the technician to walk to each wheel unit and place the tool next to a corresponding TPM sensor so as to trigger the sensor.

By design, the TPMS provides a limited amount of time for triggering each sensor. Unfortunately, should the signal not be received within the allotted time, the technician must start the learning process over. This occurs when the sensor fails to receive and process the triggering signal in the allotted time, the control module fails to receive and process the triggering signal in the allotted time, or the technician is interrupted or otherwise not able to move between the wheel units in the allocated time as indicated by the control module.

SUMMARY

The present approaches provide—methods, systems and devices for integrating one or more tire pressure monitoring (TPM) sensors with a tire pressure monitoring system (TPMS) of a vehicle. In one aspect, the features of the present invention are predicated upon, in part, programming and/or configuring, recording and storing identifiers of tire pressure monitoring sensors and transmission of the stored identifiers to a TPMS of a vehicle. In another aspect, the identifiers is stored on a TPM configuration tool that is configured to automatically or manually transmit the stored identifiers and associated data to a TPMS in response to requests made by the TPMS during a learning process. In one further particular configuration, the TPM configuration tool includes necessary protocol data for communication with the TPMS.

Using the present approaches, the probability of having to reinitiate a learning process of a vehicle is substantially reduced due to the elimination of relying on the timely triggering of a TPM sensor and reception of a signal generated by the TPM sensor by the TPMS. This is because it is no longer necessary to travel to each TPM sensor, within a prescribed time period, for the purpose of triggering the same. Further, with identification of TPM sensor being stored on a TPMS configuration tool, it is possible to eliminate walking about a vehicle and additional triggering of TPM sensors. This elimination increasing efficiency in the replacement of TPM sensors thereby saving time and reducing costs to the service shop and customers.

In view of the foregoing, in a first aspect, a method of integrating one or more tire pressure monitoring sensors with a tire pressure monitoring system of a vehicle is provided. The method includes programming and/or configuring a tire pressure monitoring sensor with a suitable program software for a tire pressure monitoring system of a vehicle. The method also includes utilizing a configuration tool to cause the tire pressure monitoring sensor to generate a signal including an identifier. The method further includes recording the identifier on a memory device of the configuration tool. The method further includes transmitting the recorded identifier from the configuration tool to a memory device of a vehicle.

In another aspect, a tool for integrating one or more tire pressure monitoring sensors with a tire pressure monitoring system of a vehicle is provided. The tool includes a low frequency wireless transmitter and a high frequency wireless transmitter. The tool further includes a high frequency wireless receiver. The tool further includes a central processing unit and a memory device including software instructions for: i) programming and/or configuring a tire pressure monitoring sensor with suitable program software for a tire pressure monitoring system of a vehicle, ii) causing the low frequency wireless transmitter to transmit a signal suitable for generating a response signal from a tire pressure monitoring sensor, iii) storing an identifier of the response signal onto a memory device, and iv) causing the high frequency wireless transmitter to transmit the recorded identifier and associated received data.

In another aspect, a computer-readable memory device storing computer program instructions is provided. Which, when executed by a computer comprising at least one processor, the result is: i) programming and/or configuring of a tire pressure monitoring sensor with suitable program software for a tire pressure monitoring system of a vehicle, ii) the transmission of a signal suitable for causing a tire pressure monitoring sensor to transmit a response signal; iii) storing of an identifier included with the response signal into a memory device; and iv) transmitting the stored identifier to a vehicle.

In another aspect a tire pressure monitoring sensor is provided. The sensor includes a pressure sensor configured for monitoring air pressure and generating signals indicative thereof. The sensor further includes a receiver configured for receiving wireless signals from a configuration tool. The sensor further includes a processing unit and memory device including suitable software for: i) storing configuration or program software received by the receiver onto the memory device, and ii) causing transmission of an identifier of the tire pressure monitoring sensor to a configuration tool in response to a request made by the configuration tool. The sensor further includes a wireless transmitter configured to transmit the identifier to a configuration tool.

These and other features can be best understood from the following specification and drawings, the following of which is a brief description.

DETAILED DESCRIPTION

Figure 1:
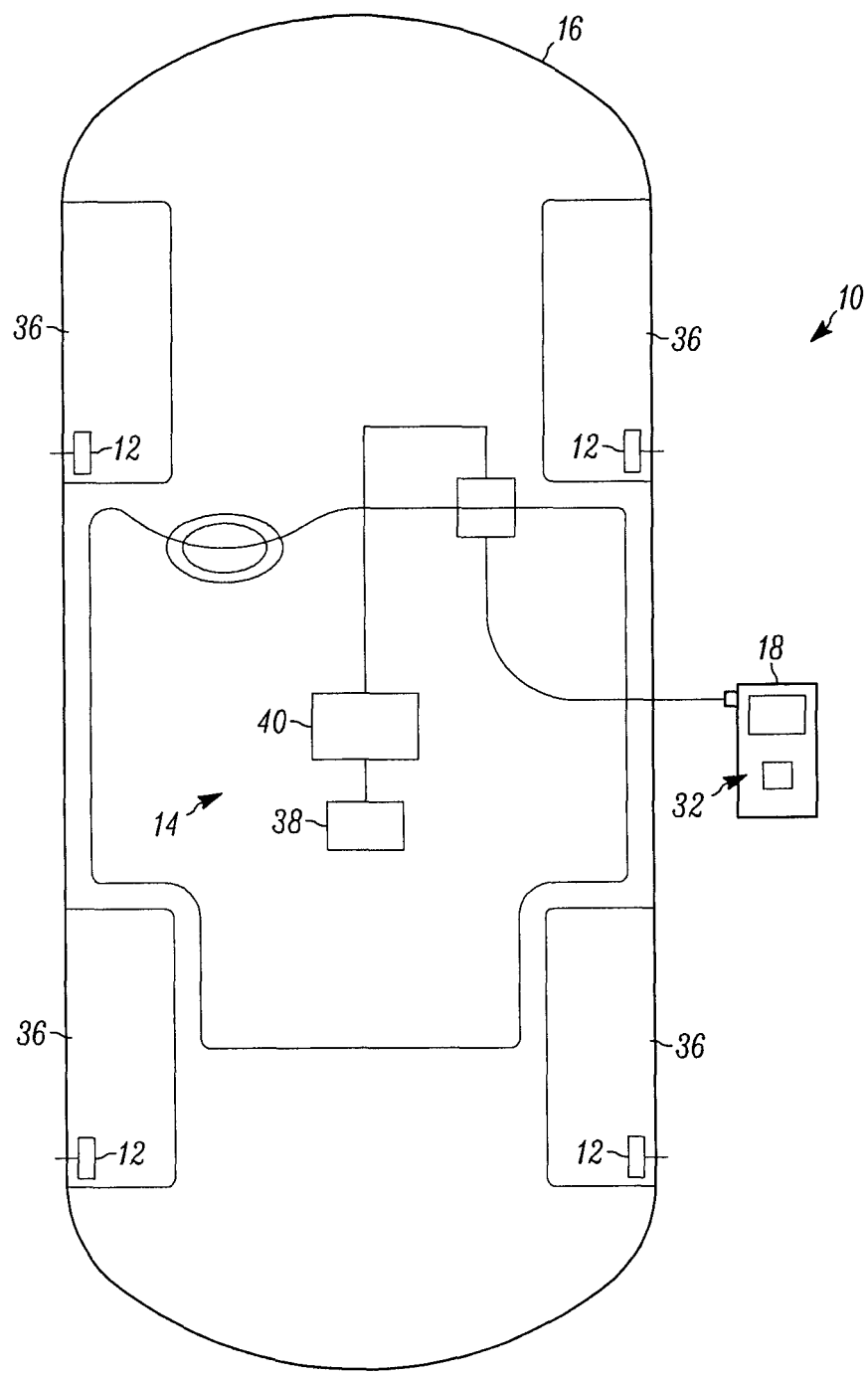
FIG. 1 illustrates a schematic view of an exemplary TPM sensor integration system for integration of a tire pressure monitoring sensor with a tire pressure monitoring system according to various embodiments of the present invention.
Figure 2:
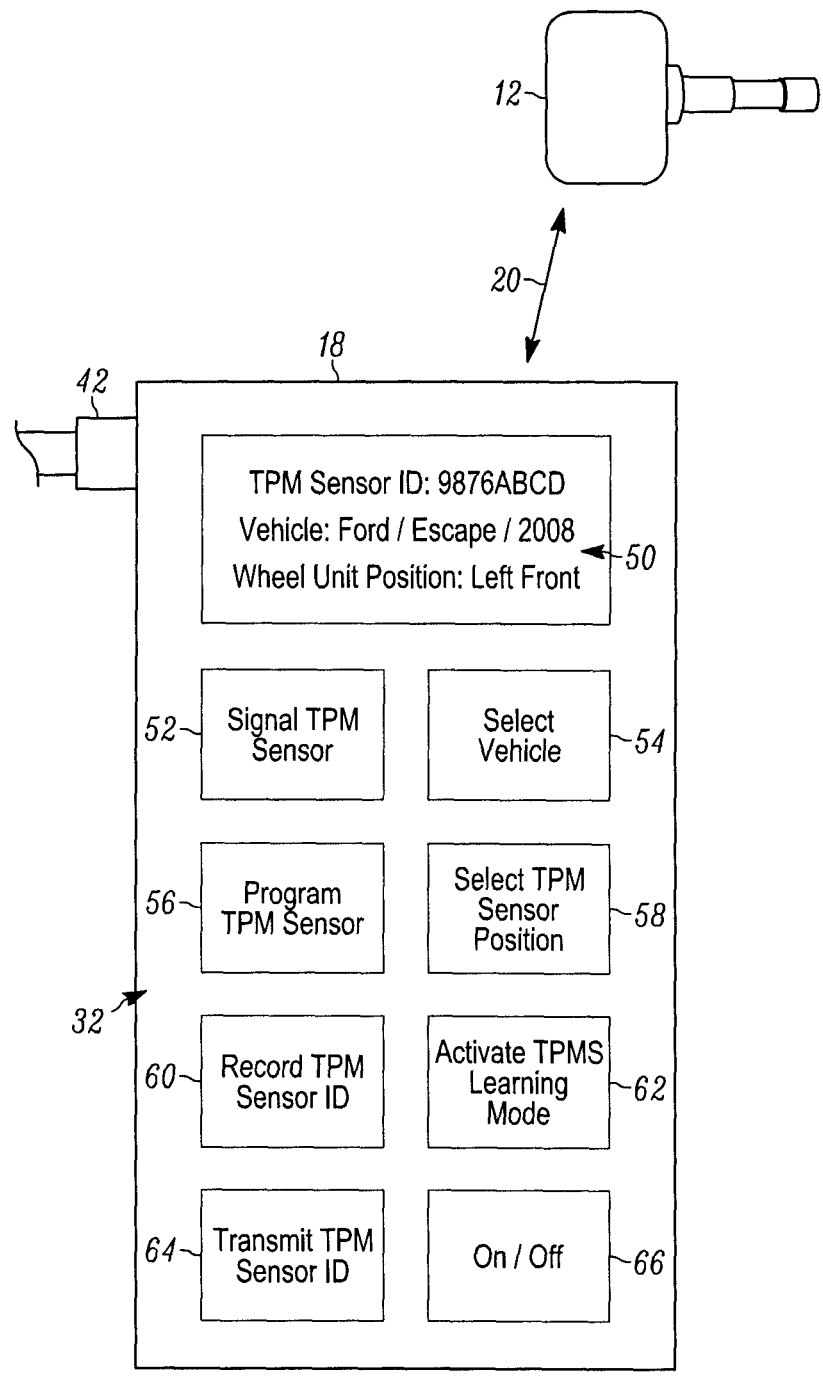
FIG. 2 illustrates a top view of an exemplary configuration tool for a tire pressure monitoring sensor according to various embodiments of the present invention.
Figure 3:
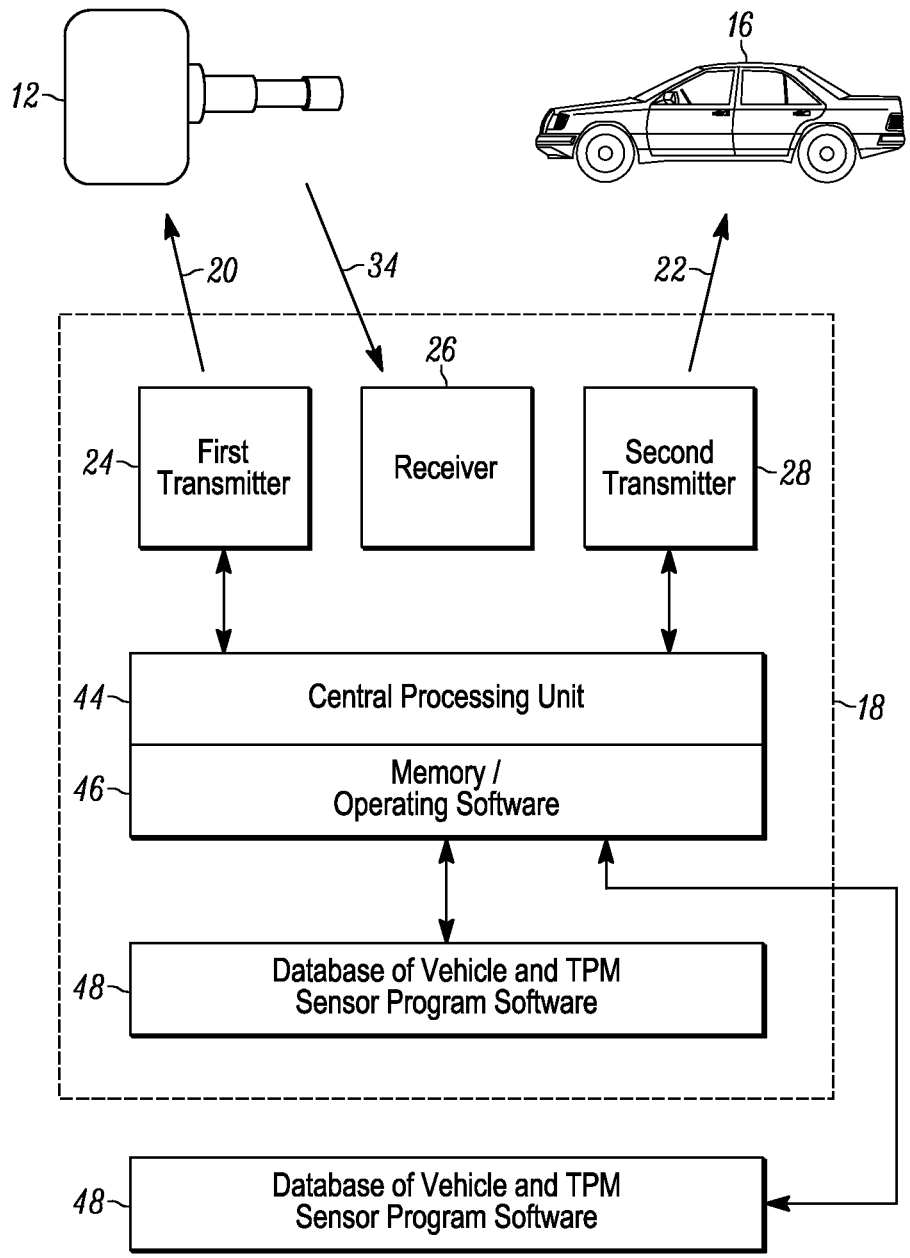
FIG. 3 illustrates a schematic view of an exemplary configuration tool for a tire pressure monitoring sensor according to various embodiments of the present invention.

Referring to FIGS. 1 through 3, exemplary integration systems 10 for integration of a tire pressure monitoring (TPM) sensor 12 with a tire pressure monitoring system (TPMS) 14 of a vehicle 16 are shown. The integration systems 10 include a configuration tool 18 for communication with a TPM sensor 12, via a first communication link 20, with a TPMS 14 of the vehicle 16, via a second communication link 22, and again with the TPMS sensor, via a third communication link 34. For example, in one example, the configuration tool 18 includes a first transmitter 24 configured to form the first wireless communication link 20 with a TPM sensor 12. The configuration tool 18 further includes a second transmitter 28 configured for forming a second wireless communication link 22 with the vehicle. The configuration tool 18 further includes a receiver 26 configured for forming a third wireless communication link 34 with the TPM sensor. The configuration tool 18 further includes a user interface 32 for interacting with program software of the configuration tool and for initiating communication links 20, 22.

In one general exemplary method of operation, an individual, such as a technician, generates a first communication link 20 between the configuration tool 18 and a TPM sensor 12 for the purpose of programming, configuring, integrating or reintegrating the TPM sensor with the TPMS 14 of the vehicle 16. In one particular configuration, the first communication link 20 comprises a wireless communication link. The user utilizes the configuration tool 18 to select a suitable software program for a TPM sensor 12 from a database of program software 48. The user then utilizes the configuration tool 18, via user interface 32, to program or configured the TPM sensor 12 and transmit a signal through the first communication link 20 to the TPM sensor 12 for the purpose of generating and receiving a response signal from the TPM sensor, including an identifier, such as numbers, letters, combinations of numbers and letters or otherwise, through the third communication link 34. The identifier is stored on a memory device of the configuration tool 18 in relationship to a particular wheel unit of the vehicle 16, such as left front, right front, left rear, right rear, spare, or otherwise. This process is repeated until all of the identifiers of the TPM sensors 12 are recorded and associated with a particular wheel unit of the vehicle.

The individual next places the vehicle in a learning mode for the purpose of integrating and/or reintegrating the TPM sensor 12 with the TPMS 14 of the vehicle 16. In one example, the individual causes the TPMS 14 to enter a learning mode according to original equipment manufacturers (OEM) procedures. Placement of the TPMS 14 into a learning mode is achieved through the performance of one or more steps, such as cycling an ignition key, pressing remote buttons, depressing a brake pedal, utilizing door lock switches, utilizing headlight switches, combinations thereof, or otherwise. In other aspects, the configuration tool causes the TPMS 14 to enter a learning mode.

Once in a learning mode, the TPMS 14 is configured to receive and interpret wireless data having a particular data format, e.g. frequency, rate of data transmission, order of data transmission, or otherwise, as prescribed by original equipment manufacturers of the TPMS or vehicle 16. The TPMS 14 is configured to receive a particular number of responses based upon the number of TPM sensors being utilized by the vehicle 16, e.g. 4. The TPMS is further configured to receive the responses in a particular order. As an example, once in the learning mode the TPMS 14 anticipates the receipt of a first wireless signal from a front passenger wheel unit, a second wireless signal from a rear passenger wheel unit, a third wireless signal from a rear driver wheel unit and the fourth wireless signal from a front driver wheel unit. Once received, the TPMS assigns a wheel position to an identifier transmitted with each wireless signal so as to identify the origination of each wireless signal received thereafter.

Once in the learning mode, the configuration tool 18 establishes a second communication link 22 with the TPMS 14 to transmit the identifier of a TPM sensor 12 to a control module 38 of the TPMS, electronic control unit 40 of the vehicle, or both. This process is repeated until all of the identifiers of the TPM sensors 12 are transmitted. Further, the identifiers are transmitted in a particular order according to the original equipment manufacturers of the TPMS 14 or vehicle 16. In one aspect, the configuration tool is manually actuated, via the user interface 32, to transmit the TPM sensor identification information. In another aspect, the configuration tool 18 automatically transmits the TPM sensor identification information.

Advantageously, features of the present invention improve upon prior systems by removing the requirement of traveling to each wheel unit of a vehicle for the purpose of triggering an associated TPM sensor during a TPMS sensor learning process. Instead, the a user is provided the ability to trigger TPM sensors at their own pace and location, which may be before or after the TPM sensors are mounted to a vehicle wheel unit. The removal of this step not only reduces learning time for a TPMS but also reduces or eliminates errors encountered during the learning process such as failure to timely trigger a TPM sensor according the original equipment manufacturers specification.

In greater detail, with reference to FIGS. 2 and 3, examples of the configuration tools 18 are shown. The configuration tools 18 include first transmitter 24 and receiver 26 for forming the first communication link 20 and the third communication link 34 with one or more TPM sensors 12, either sequentially or simultaneously. In one example, the first communication link 20 and third communication link 34 comprise wireless communication links formed between the configuration tool 18 and the TPM sensor 12. In this example, the first transmitter 24 comprises a wireless transmitter and the receiver 26 comprises a wireless receiver. The first transmitter 24 and receiver 26 are configured to send and receive signals suitable for communication with a TPM sensor 12. Accordingly, in one example, the first transmitter 24 transmits low frequency signals such as low frequency signals in the range of about 30 to 300 kHz. In one example, the receiver 26 receives high frequency signals such as signals commonly transmitted by TPM sensors 12. In one example, the high frequency signal comprises an ultra high frequency signal such as signals greater than about 300 MHz or in the range of about 300 MHz to 3 GHz. Non-limiting examples of signals receivable by the receiver includes between about 315 to 433 MHz and in certain particular configurations around 315 MHz, around 433 MHz or higher.

The configuration tools 18 further include second transmitter 28 for forming the second communication link 22 with the vehicle 16, such as with the control module 38 of the TPMS 14 or electronic control unit 40 of the vehicle 16. In one example, the second communication link 22 comprises a wireless communication link formed between the configuration tool 18 and the vehicle 16. In this example, the second transmitter 28 comprises a wireless transmitter. The second transmitter 28 is configured to send signals suitable for communication with the vehicle 16. Accordingly, in one example, the second transmitter 28 transmits high frequency signals. In one example, the high frequency signal comprises an ultra high frequency signal. It should be appreciated that ultra high frequency signals are greater than about 300 MHz or in the range of about 300 MHz to 3 GHz. In one particular configuration, the second transmitter 28 transmits signals in the range of between about 315 to 433 MHz and in certain particular configurations around 315 MHz, around 433 MHz or higher. In another example, the second communication link 22 comprises or includes a physical connection formed between the configuration tool 18 and vehicle 16. In this configuration, the configuration tool 18 includes a wire, or connection for a wire, such as a on-board diagnostic connector 42, that is configured to connect and communicate with the components of the vehicle 16.

Referring to FIG. 3, the configuration tool 18 further includes a suitable central processing unit 44 and a computer-readable memory device 46 for controlling various components of the configuration tool. The central processing unit 44 is configured for programming and/or configuring one or more TPM sensors 12 either sequentially or simultaneously. The central processing unit is further configured for generating signals through the first transmitter 24 and second transmitter 28, and processing and/or storing signals received by the receiver 26 into a memory device, such as computer-readable memory device 46 or otherwise. The central processing unit 40 further executes operating instructions for the configuration tool 18 for communication with the various devices, generation and/or interaction with a user interface 32 of the configuration tool or otherwise.

In one example, the configuration tool 18 includes or is in communication with a database of vehicle and TPM sensor program software 48 for programming and/or configuring of a TPM sensor 12. In this example, the central processing unit 44 is adapted to program and/or configure a TPM sensor with suitable program software for interacting with a particular TPMS of a particular vehicle.

In greater detail, the program software may include a single piece of code or multiple pieces of code. Such software or pieces of code can include communication protocols such as transmission frequency, data format or otherwise. Such software or pieces of code can alternatively include operation instructions for function of the TPM sensor. Still further, the software or pieces of code can include a combination of communication protocols and operation instruction, or otherwise.

In one example, the operating instructions includes a single software program (or routine) or multiple software programs (or routines or subroutines) for causing the sensor to operate, which may be according to original manufacturers specification for a TPM sensor or a tire pressure monitoring system. For example, it is contemplated that the one or more software programs causes: i) tire pressure to be measured, ii) temperature of air within a tire to be measured, iii) tire pressure data to be calibrated based upon temperature, iv) a signal to be generated and transmitted according to original manufacturers specification, v) analysis of signals received by a receiver of the TPM sensor, vi) generation of a response signal to a signal received by a receiver of the TPM sensor, vii) formation of communication protocols (such as data structure, computer instructions or otherwise, viii) combinations thereof, or ix) otherwise. In one example, once the TPM sensor is programmed with the program software the program software becomes permanently, or semi-permanently, embedded within a memory device of the TPM sensor to prevent change or substantial change of the program software.

In one example, the protocol comprises data structure of signals being generated and analyzed by the TPM sensor. The protocol can be implemented by program software received by or existing within a memory device the TPM sensor. The protocol may be automatically implemented when received by the TPM sensor, the protocol may include instruction for implementation, or otherwise. By example, the protocol may include one or more of: i) data structure, ii) computer instructions, iii) transmission frequency, iv) data frames per transmission, v) time periods between transmission, or vi) otherwise. In one particular example, the transmission received by the TPM sensor includes an indication that the signal comprises a protocol signal and includes communication protocol for the TPM sensor to operate, includes the data structure of signals to be generated including placement of wakeup signals, pressure data, temperature data, and/or otherwise. The signal also indicates frequency of transmission and number of frames to be transmitted per transmission, wherein each frame includes wakeup signal, pressure data, temperature data and/or otherwise. The protocol signal also indicates time periods between transmission. It should be appreciated that other communication protocols and configurations can be included.

The program software can vary based upon the vehicle make, model and/or year of manufacture. Alternatively, the program software can be configured for multiple applications, e.g. multiple vehicle makes, models and/or years of manufacture. As such, programming of the TPM sensor can include transfer of multiple communication protocols and/or operation instructions for multiple tire pressure monitoring systems. Also, programming or configuration of the TPM sensor can include selection of communication protocols and/or operation instruction from a database located with the TPM sensor.

Referring to FIG. 2, the configuration tool 18 includes user interface 32 for facilitating in operation of the configuration tool including initiating commands of configuration tool operation software stored on the computer-readable memory device 46. In one example, the user interface 32 comprises display screen 50 and buttons 52, 54, 56, 58, 60, 62, 64 and 66 for initiating operation commands. For example, in one example, the display screen 50 displays information received from the TPM sensor 12. In another example, the display screen 50 displays information pertaining to programming or configuration of a TPM sensor to be integrated with a vehicle 16. For example, in one configuration the display screen indicates identifier of the TPM sensor, vehicle make, model and/or year of manufacture, which the TPM sensor was or is to be mounted to, wheel unit position, which the TPM sensor was or is to be mounted to, tire data recorded by a TPM sensor, TPM sensor configuration information, TPM sensor programming information, TPM sensor make, model and/or year of manufacturer, or otherwise.

Figure 4A:
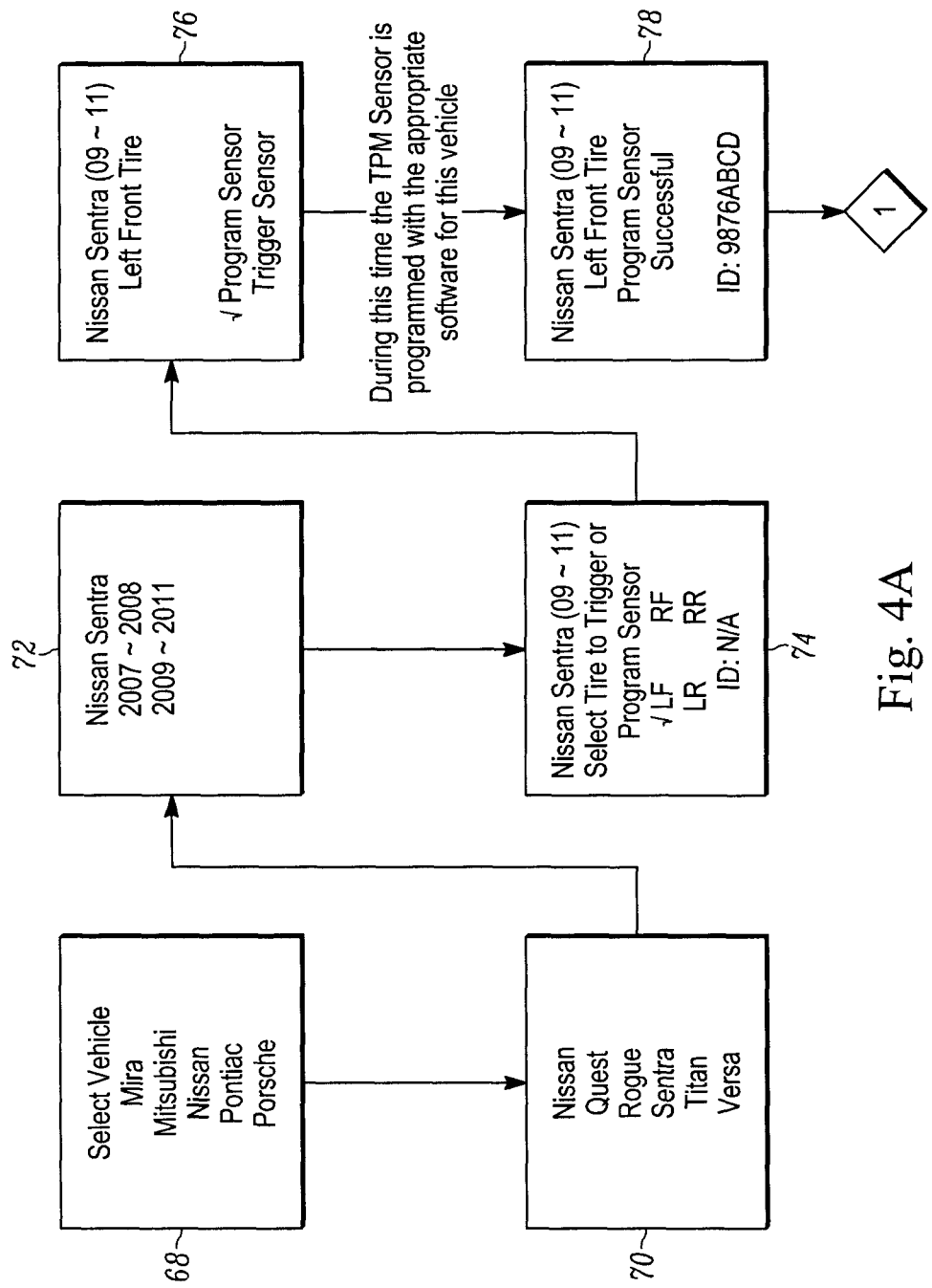
FIGS. 4A and 4B illustrate a plurality of screenshots of a configuration tool during a recording process of a plurality of tire pressure monitoring sensors according to various embodiments of the present invention.
Figure 4B:
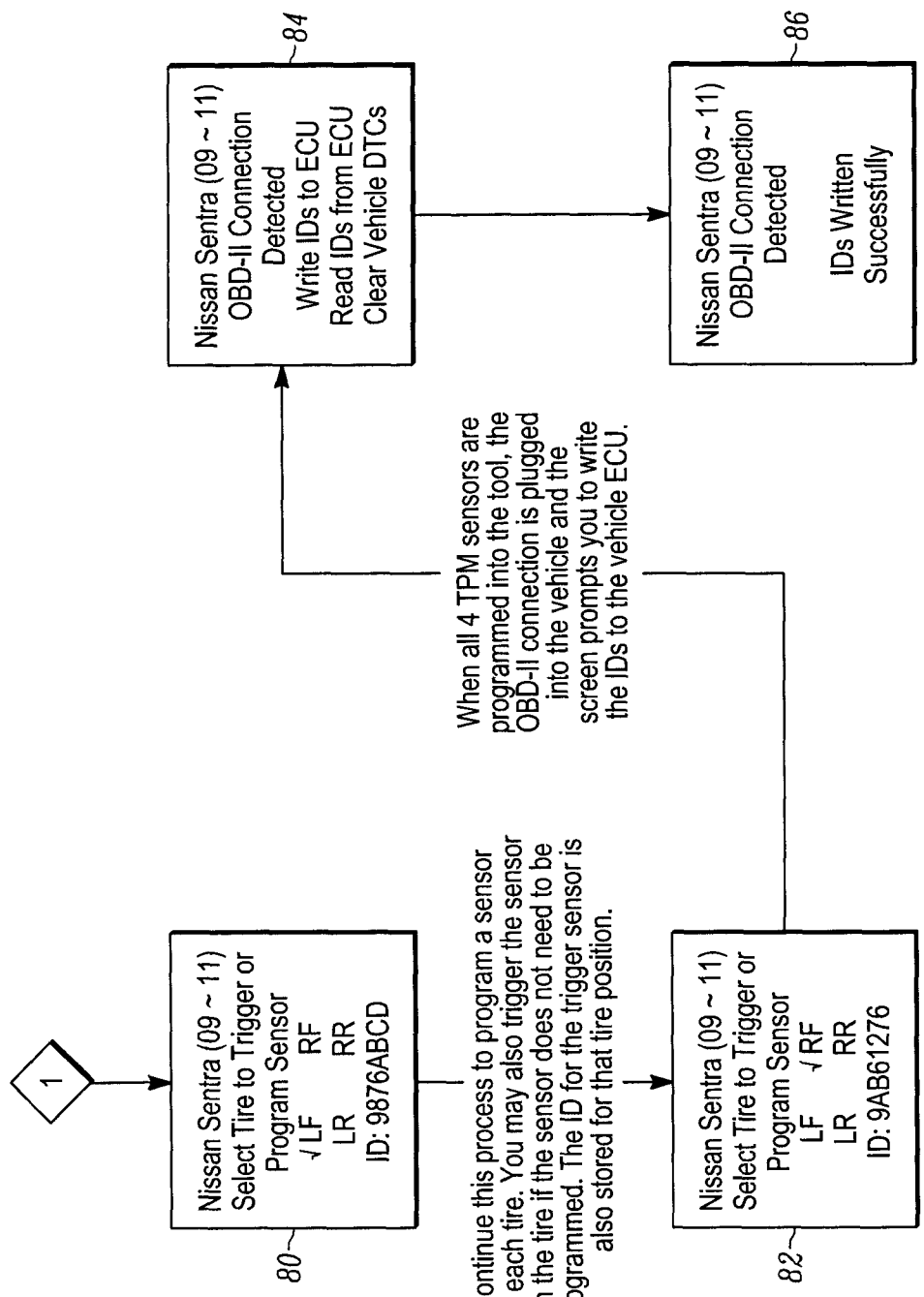

In another aspect and referring to FIGS. 4A and 4B, the display screen 50 displays various information for viewing or selection during configuration or programming of a TPM sensor 12. The configuration tool 18 includes a touch screen and/or scroll buttons for selection and manipulation through the various screens. For example, in a first screenshot 68, the display screen 50 lists the vehicle make to which a TPM sensor 12 is to be programmed or configured for. In a second screenshot 70, the display screen 50 lists the models of the selected vehicle make. In a third screenshot 72, the display screen 50 lists years of manufacture of the selected vehicle make and model. In a fourth screenshot 74, the display screen 50 lists the wheel unit the TPM sensor was or is to be utilized for. In a fifth screenshot 76, the display screen 50 provides the ability to program or trigger the TPM sensor 12. In a sixth screenshot 78, the display screen 50 indicates that the TPM sensor 12 has been programmed and the identifier of the TPM sensor from a response signal. In a seventh screenshot 80, the display screen 50 provides the ability to assign a wheel position for the programmed or configured TPM sensor 12 and displays the identifier obtained during the trigging step. In an eighth screenshot 82, the display screen 50 provides the ability to assign a wheel position for another programmed or configured TPM sensor 12 and displays the identifier obtained during the trigging step. In a ninth screenshot 84, the display screen 50 provides the ability to write the recorded identifier to an electronic control unit 40 of the vehicle 16, read identifiers of TPM sensors 12 from the electronic control unit of the vehicle, or clear the memory device of the electronic control unit of previously stored TPM sensor identifiers. In a tenth screenshot 86, the display screen 50 confirms that the TPM sensor identifier has been properly written to the memory device of the electronic control unit 40 of the vehicle 16. It should be appreciated that additional screenshots would be generated for triggering and programming or configuring of additional TPM sensors, and for transmitting identification and location information of previously triggered TPM sensors. Other screenshot can also be generated according to the teachings of the present invention.

Referring again to FIG. 2, alternatively or in conjunction with the screenshots, the user interface 32 includes buttons 52-66 for performing similar and/or additional functions to that of the screenshots. For example, in one aspect, the configuration tool 18 includes a Signal TPM Sensor button 52 which initiates the transmission of a trigger signal through the first transmitter 24. As previously indicated, the display screen displays the response transmission from the TPM sensor including the TPM sensor identifier. The user interface 32 further includes a Select Vehicle button 54 for selecting a configuration or program software for a TPM sensor. The user interface 32 further includes a Program TPM Sensor button 56 which initiates programming of one or more TPM sensors based upon the selected vehicle, make, model and year of manufacture. The user interface 32 further includes Select TPM Sensor Position button 58 for indicating which wheel unit 36 the TPM sensor 12 was or is to be mounted to. The user interface 32 further includes a Record TPM Sensor ID 60 for recording in a memory device of the configuration tool the TPM sensor identifier and wheel unit position. The user interface 32 further includes an Activate TPMS Learning Mode button 62 for placing the vehicle in learning mode thereby causing the TPMS to transmit signals requesting TPM identifier for particular wheel units. The user interface 32 further includes a Transmit TPM Sensor ID button 64 for transmitting one or more TPM sensor identifiers through the second transmitter 28. The user interface 32 further includes an On/Off button 66. It should be appreciated that more or less buttons may be used, in view of the teachings herein, and may be configured to act with the screenshots shown and described with reference to FIGS. 4A and 4B.

Figure 6:
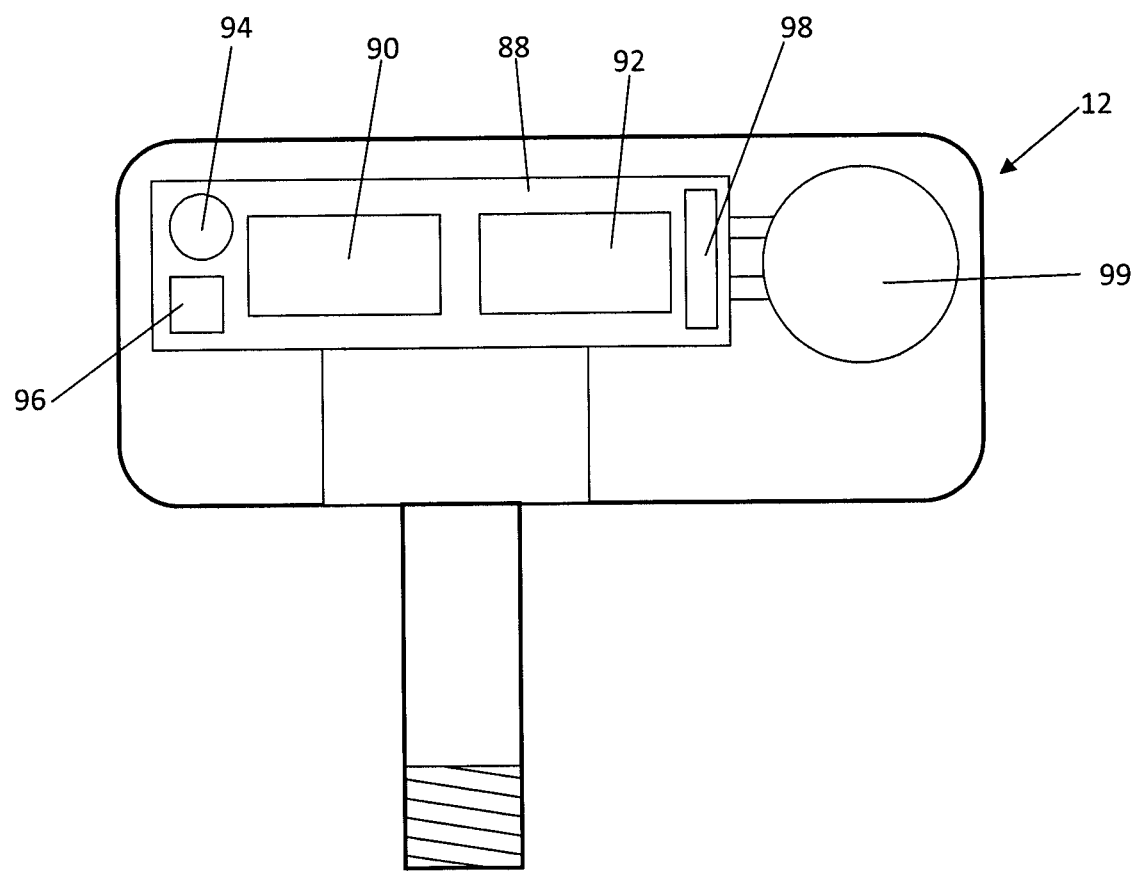
FIG. 6 illustrates a top view of a tire pressure monitoring sensor including an integrated circuit according to various embodiments of the present invention.

Referring to FIG. 6, an exemplary TPM sensor 12 is shown. The sensor includes an integrated circuit board 88 including a processing unit 90, one or more computer-readable memory device 92, pressure sensor 94, receiver 96 and wireless transmitter 98. The TPM sensor 12 further includes a suitable power supply, such as battery 99, for providing power to various components of the integrated circuit board 88 including processing unit 90, wireless transmitter 98 or otherwise. The pressure sensor 94 of the TPM sensor 12 generates raw data indicative of air pressure within the associated tire. The raw data is transmitted to the processing unit 90 and stored on the computer-readable memory device 92 of the TPM sensor 12. In one aspect, the memory device 92 further stores the unique identifier for the TPM sensor 12.

The receiver 96 is configured for receiving wireless signals from the configuration tool 18. The signals received by the receiver 96 are transmitted to the processor 90 where it is evaluated in part through suitable software stored on the computer-readable memory device 92. Should the signal be interpreted as a request for a transmission of the unique identifier then the processor 90 transmits the identifier through the transmitter 98. Examples of signals that can be interpreted as a request for a transmission of an identifier include signals having a particular frequency, code or both. Such signals may include signals commonly transmitted by a configuration tool for causing triggering of a TPM sensor or a signal including instructions for transmission of the unique identifier, or otherwise. Similarly, response signals initiated by the processor 90 and software stored on the computer-readable memory device 92 may include a signal including data commonly transmitted by the TPM sensor (e.g. tire pressure data, transmission formats, temperature, identifier or otherwise), alternatively the response signal may solely, or substantially solely, include the unique identifier, or alternatively the response signal may include a combination of the unique identifier and data commonly transmitted by the TPM sensor. Other configurations are possible.

Figure 5:
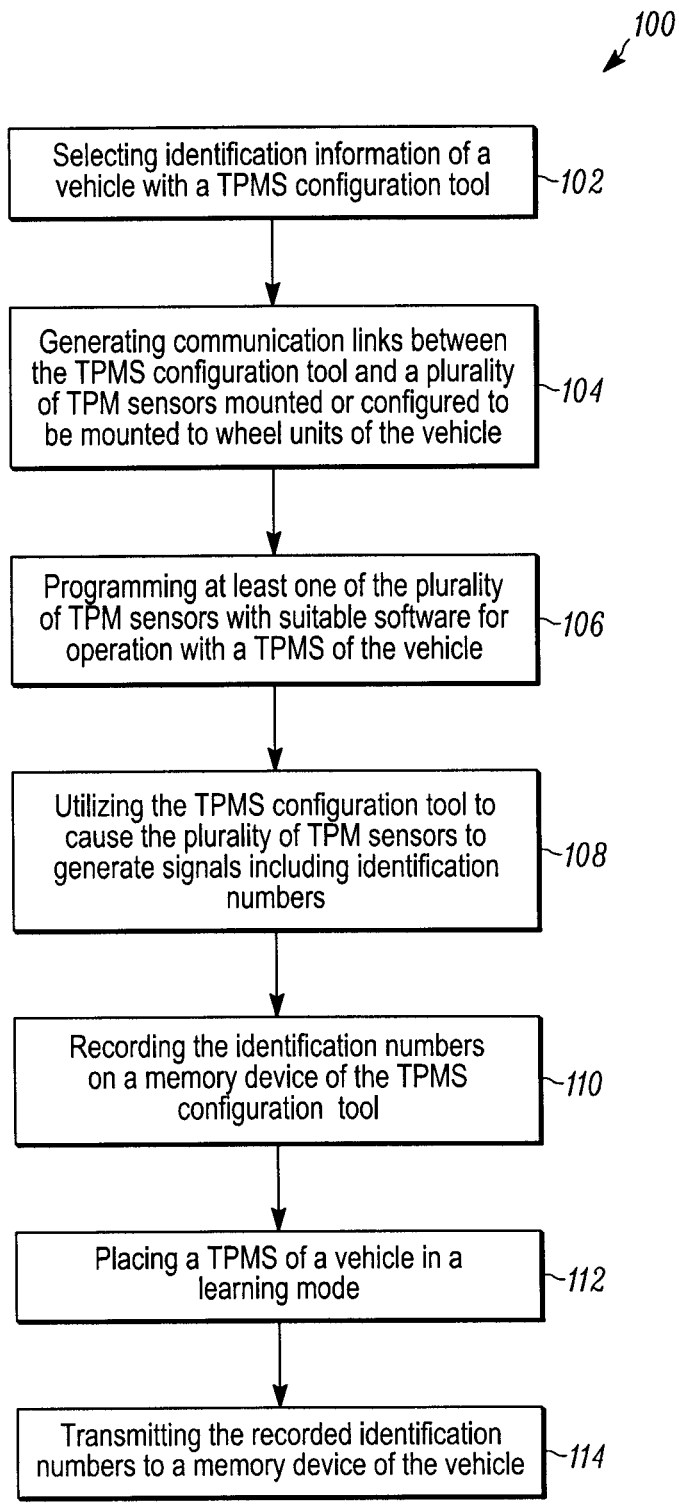
FIG. 5 illustrates a flow chart illustrating an exemplary method of integrating a tire pressure monitoring sensor with a tire pressure monitoring system according to various embodiments of the present invention.

Referring to FIG. 5, methods 100 of integrating TPM sensors 12 with a TPMS 14 of a vehicle are provided. The method includes a step 102 of selecting identification information of a vehicle 16 with a TPMS configuration tool 18. In one exemplary configuration, the selection process comprises the selection process shown in FIG. 4A.

The method includes a step 104 of generating communication links between a TPMS configuration tool 18 and a plurality of TPM sensors 12 mounted or configured to be mounted to wheel units 36 of a vehicle 16. In one configuration, this comprises a technician or user walking about a vehicle to each wheel unit and placing the configuration tool 18 proximate with a corresponding TPM sensor 12 of each wheel unit 36. At each wheel unit, the technician or user utilizes the user interface 32 of the configuration tool 18 to form first communication links 20 with the TPM sensors 12, by transmitting a signal through the first transmitter 24. In one alternate configuration, one or more of the TPM sensors 12 may not yet be mounted to a wheel unit 36 but instead be configured for mounting to a wheel unit. Such condition may arise when one or more TPM sensors are being replaced by new TPM sensors.

The method includes a step 106 of programming or configuring at least one of the plurality of TPM sensors 12 with suitable software for operation with a TPMS 14 of the vehicle. In situations where a signal TPM sensor 12 is being replaced, this comprises a programming or configuring of a single programmable TPM sensor; however, it may comprise programming or configuring multiple TPM sensors. To this end, this may include simultaneous programming or configuring of a plurality of TPM sensors 12 or sequential programming of TPM sensors.

The method includes a step 108 of utilizing the TPMS configuration tool 18 to cause the TPM sensors 12 to generate signals including identifiers of each TPM sensor. This step is performed at each wheel unit, proximate to each TPM sensor 12 or combination thereof. In one configuration, the TPM sensors generate signals, and in particular response signals, based upon the signals transmitted by the TPMS configuration 18 through the first transmitter 24. In one particular configuration, the signal transmitted by the TPMS configuration 18 comprises what is commonly called a TPM sensor trigger signal.

The method includes a step 110 of recording the identifiers of each TPM sensor 12 on a computer-readable memory device 46, or other memory device, of the TPMS configuration tool 18. In one configuration, the signals received by the TPMS configuration tools 18 are analyzed, through the use of the central processing unit 44 and software stored on a computer-readable memory device 46, to determine the identification code. In another configuration, the signal received by the TPMS configuration tool 18 is simply recorded on the computer readable memory device 46, or other memory device, including identification information of the TPM sensor 12, tire pressure data or otherwise. In either configuration, the identifier and/or signal is associated with a particular wheel unit 36 position of the vehicle 16 utilizing the TPMS configuration tool, as shown in FIG. 4A.

The method includes a step 112 of placing the TPMS 14 of the vehicle 16 in a learning mode. In one configuration this is achieved utilizing original equipment manufacturers procedures. In another configuration, this is achieved through the use of the TPMS configuration tool 18. In either configuration, the TPMS 14 of the vehicle is ready, and expected, to receive a signal, including identifier, from a particular TPM sensor 12 of a particular wheel unit 36 in a prescribed amount of time.

The method includes a step 114 of transmitting the recorded identifiers to a memory device of the vehicle 16, such as a memory device of the TPMS 14, electronic control unit 40 or otherwise. In one configuration, the technician or user utilizes the user interface 32 of the TPMS configuration tool 18 to selectively transmit the recorded TPM sensor 12 signals, identifiers, or both, to the TPMS 14 in a prescribed order according to original equipment manufacture's procedures, e.g. right front, right rear, left rear, left front or other combinations thereof. In another configuration, the TPMS configuration tool 18 automatically transmits the recorded signals, identifiers, or both, to the TPMS 14 in a prescribed order. This automatic transmission can be based upon an indication received by the vehicle, technician or otherwise. As previously mentioned, the recorded signals, identifiers, or both, can be transmitted by the second transmitter 28 of the TPMS configuration tool 18 or through an on-board diagnostic connector 42. It should be appreciated that more or less steps may be included, as shown and described herein.

While the invention has been described with reference to a preferred embodiment it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of integrating one or more tire pressure monitoring sensors with a tire pressure monitoring system of a vehicle, the method comprising:

from a portable configuration tool (18) that is disposed outside the vehicle, programming or configuring a first tire pressure monitoring sensor (12), a second tire pressure monitoring sensor (12), a third tire pressure monitoring sensor (12), and a fourth tire pressure monitoring sensor (12) with a suitable program software;

without being in a learning mode of a receiver in the vehicle, utilizing the portable configuration tool (18) to cause the first tire pressure monitoring sensors (12) to generate a first signal including a first identifier, a second signal including a second identifier, a third signal including a third identifier, and a fourth signal including a fourth identifier;

when not in the learning mode of the receiver in the vehicle, recording the first identifier, the second identifier, the third identifier, and the fourth identifier on a memory device of the portable configuration tool (18); and when the receiver in the vehicle (16) enters the learning mode, transmitting the recorded first, second, third, and fourth identifiers from the portable configuration tool (18) to the receiver disposed in the vehicle, the receiver having a memory device, wherein the first, second, third, and fourth identifiers are transmitted in a predetermined order allowing the receiver while in the learning mode to associate each of the first, second, third, and fourth identifiers with one of: a front passenger wheel unit, a rear passenger wheel unit, a rear driver wheel unit, or a front driver wheel unit;

wherein the portable configuration tool and the receiver in the vehicle are physically distinct and separate from the other.

2. The method of claim 1, further comprising the step of selecting the suitable program software for the first, second, third, and fourth tire pressure monitoring sensors (12) based upon identification information of a vehicle (16).

3. The method of claim 2, wherein the suitable program software is selected from a database of program software (48) for the first, second, third, and fourth tire pressure monitoring sensors (12).

4. The method of claim 3, further comprising the step of forming a communication link with the database of program software (48) for the first, second, third, and fourth tire pressure monitoring sensors (12).

5. The method of claim 3, wherein the portable configuration tool (18) includes the database of program software (48) for the first, second, third, and fourth tire pressure monitoring sensors (12).

6. The method of claim 1, wherein the suitable program software is selected through a user interface (32) of the portable configuration tool (18).

7. The method of claim 1, wherein the communication link (20) between the tire pressure monitoring sensor (12) and the portable configuration tool (18) is established prior to mounting of the tire pressure monitoring sensor (12) to a wheel unit (36) of the vehicle (16).

8. The method of claim 1, wherein the signal further includes tire pressure data.

9. The method of claim 1, wherein the first, second, third, and fourth identifiers of the tire pressure monitoring sensors (12) are transmitted to the memory device of the receiver at the vehicle (16) through a wireless communication link (22).

10. The method of claim 1, wherein the first, second, third, and fourth identifiers of the tire pressure monitoring sensors (12) are transmitted to the memory device of the receiver at the vehicle (16) through an on-board diagnostic connector (42).

11. The method of claim 1, wherein the portable configuration tool (18) includes a wireless receiver (26) configured to receive the first, second, third, and fourth signals.

12. The method of claim 1, further comprising the step of selecting the suitable program software for the plurality of tire pressure monitoring sensors (12) based upon identification information of a vehicle (16).

13. The method of claim 12, wherein the suitable program software is selected from a database of program software (48) for the first, second, third, and fourth tire pressure monitoring sensors (12).

14. A configuration tool (18) for integrating one or more tire pressure monitoring sensors (12) with a tire pressure monitoring system (14) of a vehicle (16), comprising:

a low frequency wireless transmitter (24);
a high frequency wireless receiver (26);
a high frequency wireless transmitter (28); and
a central processing unit (44) and a memory device (46) including software instructions for:

programming or configuring a first tire pressure monitoring sensor (12), a second tire pressure monitoring sensor (12), a third tire pressure monitoring sensor (12), and a fourth tire pressure monitoring sensor (12) with suitable program software for a tire pressure monitoring system (14) of a vehicle (16);

while not in learning mode of a receiver at the vehicle, causing the low frequency wireless transmitter (24) to transmit a signal suitable for generating a first response signal from the first tire pressure monitoring sensor (12), a second response signal from the second tire pressure monitoring sensor (12), a third response signal from the third tire pressure monitoring sensor (12), and a fourth response signal from the fourth tire pressure monitoring sensor (12);

when not in learning mode at the receiver at the vehicle, storing a first identifier of the first response signal, a second identifier of the second response signal, a third identifier of the third response signal, and a fourth identifier of the fourth response signal onto a memory device (46); and causing the high frequency wireless transmitter (28) to transmit the recorded first, second, third, and fourth identifiers, wherein the first, second, third, and fourth identifiers are transmitted in a predetermined order to a receiver allowing the receiver while in the learning mode to associate each of the first, second, third, and fourth identifiers with one of: a front passenger wheel unit, a rear passenger wheel unit, a rear driver wheel unit, or a front driver wheel unit;

wherein the tool is configured to be portable and moved from tire-to-tire, the tool communicating with a receiver disposed within a vehicle, the tool being physically separate from the receiver disposed within the vehicle.

15. The configuration tool (18) of claim 14, further comprising a database of program software (48) for the first, second, third, and fourth tire pressure monitoring sensors (12).

16. The configuration tool (18) of claim 14, further comprising a connector (42) for forming a communication link with a database of program software (48) for the first, second, third, and fourth tire pressure monitoring sensors (12).

17. The configuration tool (18) of claim 14, further comprising a user interface (32) for interacting with the software instructions and causing the low frequency wireless transmitter (24) to program or configure the first, second, third, and fourth tire pressure monitoring sensors (12) with suitable software.

18. The configuration tool (18) of claim 17, wherein the user interface (32) is configured for interacting with the software instructions and causing the low frequency wireless transmitter (24) to transmit the signal suitable for generating a response signal from the first, second, third, and fourth tire pressure monitoring sensors (12).

19. The configuration tool (18) of claim 17, wherein the user interface (32) is configured for interacting with the software instructions and causing the high frequency wireless transmitter (28) to transmit the recorded first, second, third, and fourth identifiers.

20. The configuration tool (18) of claim 17, wherein the user interface (32) is configured for transmitting the recorded identifiers to an electronic control unit (40) of a receiver of a vehicle (16) through an on-board diagnostic connector (42).

21. A computer-readable memory device storing computer program instructions which when executed by a computer comprising at least one processor results in:
programming or configuring of a first tire pressure monitoring sensor (12), a second tire pressure monitoring sensor (12), a third tire pressure monitoring sensor (12), and a fourth tire pressure monitoring sensor (12) with suitable program software for a tire pressure monitoring system (14) of a vehicle (16), the programming or configuring being accomplished via a portable tool that is moved from tire-to-tire;
when not in a learning mode of a receiver at the vehicle, transmission of a first signal suitable from the portable tool for causing the first tire pressure monitoring sensor (12) to transmit a first response signal, transmission of a second signal suitable from the portable tool for causing the second tire pressure monitoring sensor (12) to transmit a second response signal, transmission of a third signal suitable from the portable tool for causing the third tire pressure monitoring sensor (12) to transmit a third response signal, and transmission of a fourth signal suitable from the portable tool for causing the fourth tire pressure monitoring sensor (12) to transmit a fourth response signal;
when not in learning mode at the receiver at the vehicle, storing of first identifier included with the first response signal, a second identifier included with the second response signal, a third identifier included with the third response signal, and a fourth identifier included with the fourth response signal into a memory device at the portable tool; and
transmitting the stored first, second, third, and fourth identifiers from the portable tool to a receiver disposed within the vehicle (16), wherein the first, second, third, and fourth identifiers are transmitted in a predetermined order to a receiver allowing the receiver while in the learning mode to associate each of the first, second, third, and fourth identifiers with one of: a front passenger wheel unit, a rear passenger wheel unit, a rear driver wheel unit, or a front driver wheel unit.

22. The computer-readable memory device of claim 21, further resulting in display of the first, second, third, and fourth identifiers on a user interface (32).

23. A tire pressure monitoring sensor (12), comprising:
a pressure sensor (94) configured for monitoring air pressure and generating signals indicative thereof;
a receiver (96) configured for receiving wireless signals from a portable configuration tool (18);
a processing unit (90) and memory device (92) including software for:
when not in a learning mode of a receiver unit of a vehicle, storing configuration or program software received by the receiver (96) onto the memory device (92),
causing transmission of a first identifier of the tire pressure monitoring sensor (12) to the portable configuration tool (18) in response to a request by the portable configuration tool (18); and
a wireless transmitter (98) configured to transmit the first identifier to the portable configuration tool (18) for storage onto the configuration tool (18) and eventual transmission to a memory storage unit of the receiver unit within the vehicle (16);
wherein the a second tire pressure monitoring sensor transmits a second identifier to the configuration tool, a third tire pressure monitoring sensor transmits a third identifier to the configuration tool, and a fourth tire pressure monitoring sensor transmits a fourth identifier to the configuration tool;
wherein the first, second, third, and fourth identifiers are transmitted in a predetermined order to the receiver unit allowing the receiver unit while in a learning mode to associate each of the first, second, third, and fourth identifiers with one of: a front passenger wheel unit, a rear passenger wheel unit, a rear driver wheel unit, or a front driver wheel unit.

24. The tire pressure monitoring sensor (12) of claim 23, wherein the receiver (96) comprises a low frequency receiver configured to receive wireless signals in the range of about 30 to 300 kHz.

25. The tire pressure monitoring sensor (12) of claim 23, wherein the wireless transmitter (98) comprises a low frequency transmitter configured to transmit wireless signals in the range of about 30 to 300 kHz.

26. The tire pressure monitoring sensor (12) of claim 23, wherein the wireless transmitter (98) comprises a high frequency transmitter configured to transmit wireless signals in the range of about 300 MHz to 3 GHz.

27. The tire pressure monitoring sensor (12) of claim 23, wherein processing unit (90) and memory device (92) including suitable software further transmits recorded data from the pressure sensor (94).

28. The tire pressure monitoring sensor (12) of claim 23, wherein processing unit (90) and memory device (92) including suitable software transmits only the identifier to the portable configuration tool (18).

* * * * *